US012638620B2

(12) United States Patent
Smithwick et al.

(10) Patent No.: US 12,638,620 B2
(45) Date of Patent: May 26, 2026

(54) DISPLAY SYSTEM FOR PRODUCING WIDE-ANGLE, RETROREFLECTIVE REAL IMAGES

(71) Applicant: DISNEY ENTERPRISES, INC., Burbank, CA (US)

(72) Inventors: Quinn Y. Smithwick, Pasadena, CA (US); Lanny S. Smoot, Thousand Oaks, CA (US); Michael Ilardi, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 413 days.

(21) Appl. No.: 18/206,776

(22) Filed: Jun. 7, 2023

(65) Prior Publication Data

US 2024/0411064 A1    Dec. 12, 2024

(51) Int. Cl.
*G02B 5/12* (2006.01)
*G02B 5/10* (2006.01)
*G02B 30/54* (2020.01)

(52) U.S. Cl.
CPC ................. *G02B 5/12* (2013.01); *G02B 5/10* (2013.01); *G02B 30/54* (2020.01)

(58) Field of Classification Search
None
See application file for complete search history.

(56) References Cited

U.S. PATENT DOCUMENTS

| | | | | |
|---|---|---|---|---|
| 5,629,806 A | * | 5/1997 | Fergason | G02B 27/144 |
| | | | | 359/633 |
| 6,421,182 B1 | * | 7/2002 | Holden | G02B 30/56 |
| | | | | 359/479 |
| 10,940,800 B2 | * | 3/2021 | Imamura | G02B 5/3083 |
| 2010/0014053 A1 | * | 1/2010 | Brentnall, III | G03B 21/00 |
| | | | | 353/7 |
| 2010/0195055 A1 | * | 8/2010 | Maekawa | G02B 5/136 |
| | | | | 353/10 |
| 2019/0235375 A1 | * | 8/2019 | Martinez | G03B 21/10 |
| 2021/0302758 A1 | * | 9/2021 | Smithwick | G02B 27/286 |
| 2024/0001761 A1 | * | 1/2024 | Dehkordi | B60K 35/10 |
| 2024/0134189 A1 | * | 4/2024 | Shimose | B60K 35/211 |

FOREIGN PATENT DOCUMENTS

WO      WO-2018103670 A1 *   6/2018   ............. G02B 5/128

* cited by examiner

*Primary Examiner* — Jyotsna V Dabbi
(74) *Attorney, Agent, or Firm* — Dorsey & Whitney LLP

(57) ABSTRACT

A wide-angle, retroreflective real image display system that produces real images that can be viewed and interacted with by a group of people who can move about a space to view the real image. The display system includes two or more stations each having their own retroreflector, beamsplitter, and displayed image or illuminated object. The stations, and their beamsplitters and retroreflectors are positioned adjacent at angular offsets or rotation angles, e.g., each neighboring or adjacent beamsplitter and retroreflector is rotated about an axis extending through the joining seam. The displayed images or illuminated objects are rotated at similar angles from each other to provide a retroreflective pyramid with co-located real images.

20 Claims, 7 Drawing Sheets

RETROREFLECTOR, 112

BEAMSPLITTER, 114

115

119

118

RETROREFLECTED LIGHT

117

OBJECT DISPLAY, 116

RETROREFLECTIVE REAL IMAGE, 120

110

VIEWING SPACE, 108

VIEWER, 104

DISPLAY SYSTEM FOR PRODUCING WIDE-ANGLE, RETROREFLECTIVE REAL IMAGES

FIELD

The present description relates, in general, to techniques and systems for generating unique displays with floating imagery, and, more particularly, to a real image display system (and associated methods) configured for generating real images with wide viewing angles using retroreflective material.

BACKGROUND

There are many applications and environments where it is desirable to produce images or imagery that appear to float in space. For example, it is useful to entertain people visiting a theme park, a theater, a shopping space, and so on with unique and surprising displays, and these may involve providing images that are, or appear to be, floating in space as is the case with holograms. Further, there is a strong demand for such floating images to be viewable without requiring the viewer to wear special eyewear such as virtual reality (VR) headgear or three dimensional (3D) glasses.

Retroreflective real images appear as floating images in space. Retroreflective real images are desirable in many settings because they are accessible in that they appear "free standing" such that the viewer may try to touch the floating image. This visual effect is unlike the imagery achieved with systems built upon the Pepper's Ghost illusion. In these systems, the reflected virtual image is necessarily behind a pane of glass or other beamsplitter. In contrast, retroreflective real images can be thought of as a simple way of creating "holograms" or 3D beam effects without display mechanisms that are obvious to the viewer.

FIG. 1 illustrates a prior art display system 110 that combines a retroreflector (e.g., a screen of retroreflective material) 112 with a beamsplitter 114 and an illuminated object/display 116 in a conventional manner to provide or generate a retroreflective real image 120 that appears to a viewer 104 to float in a viewing space 108. As shown, the light 117 from a display or object 116 is directed onto a back surface 115 of a beamsplitter 114 (e.g., a half-mirror made of glass, plastic, or the like). A portion of the light 117 is reflected as shown at 118 and illuminates a retroreflector panel/screen (or simply "retroreflector") 112. This light 118 is retroreflected 119, rather than scattered) back toward, and passes through, the beamsplitter 114 to be focused as a real image 120 at a "floating" plane or location in the viewing space 108.

While the retroreflective real image 120 appears (to the viewer 104) undistorted with a 1:1 ratio in size and depth to the original display or object 116 via operation of the system 110, there are a number of limitations or disadvantages to use of the conventional display system 110. It is difficult to make retroreflective real images that are viewable over a wide field of view by many people. Retroreflectors, such as screen/panel 112, have a small acceptance angle, i.e., the angle of incident light that are retroreflected and form real images such as image 120. Other angles do not retroreflect and create scatter, which reduces contrast and creates blurred images. Further, as the system gets wider and the field of view becomes wider the of planar beam splitters and planar retroreflectors requires large widths to ensure both the retroreflector and the beamsplitter appear behind the real image at large angles that are required for the effect to work.

Also, at large angles, light incident on the retroreflector scatters undesirably rather than retroreflecting, and this can create haze, low contrast, and blurry real images.

To increase the viewing angle of the retroreflective real image, some display systems have been developed that use a curved beamsplitter. In these display systems, the light from a display or object passes through a curved beamsplitter or half-mirror and illuminates a retroreflector panel. This light is retroreflected back toward the display or object but is deflected and reflected by the curved beamsplitter to be focused as a real image at a floating plane or position in a viewing space. The curved concave beamsplitter demagnifies or "minifies" the retroreflective real image but increases its viewing angle similar to the operation of a wide-angle security mirror. Unfortunately, the use of the curved beamsplitter not only makes the retroreflective real image appear smaller in spatial extent but also moves the location of the real image closer to the beamsplitter. This severely limits the maximum attainable depth to be very close to the beamsplitter's outer or front surface proximate to the viewing space. Further, there is significant distortion in the retroreflective real image that may change with viewing angle. As a result, straight lines in the display's image or illuminated object can appear to be curved in the retroreflective real image and may even "swim" or move as the viewer observes the display system from different angles as they move within a viewing space.

Hence, there remains a need for a new display system, and corresponding methods, to producing a retroreflective real image that is wide-angle viewable. Such a system would make this unique floating image effect applicable to larger scale viewing spaces, such as found in many attractions of theme parks and other settings, with higher viewer throughput.

SUMMARY

The inventors recognized several deficiencies with prior approaches to providing a retroreflective real image, including a small acceptance angle of the retroreflector. The beamsplitter and retroreflector (or screen of retroreflective material) have to be behind the real image, but this often forced the display system designer to use very wide beamsplitters and retroreflectors such that the display system had to be quite large. The inventors also realized that use of curved beamsplitters was not particularly useful in part because the real image was located very close to the beamsplitter's surface. Some display system designs also undesirably magnified or shrunk the displayed image or illuminated object or produced a real image with unacceptable distortion.

The inventors address these and other issues with a wide-angle, retroreflective real image display system that produces real images that can be viewed and interacted with by a larger group of people who can move about a space to view the real images from a wide range of locations. In brief, the display system may be configured to use two or more stations each having their own retroreflector, beamsplitter, and displayed image or illuminated object. The stations, and their beamsplitters and retroreflectors are positioned adjacent each other at angular offsets (e.g., each neighboring or adjacent beamsplitter and retroreflector is rotated about an axis extending through the joining seam), which may be selected based on the acceptance angle to be 20 degrees or in the range of about 15 to 45 degrees or larger) while the displayed images or illuminated objects are rotated at similar angles from each other to provide a retroreflective pyramid with co-located real images from each station.

In other embodiments, the display system uses a single retroreflector, beamsplitter, and displayed image or illuminated object but adds a pair of curved reflectors (or mirrors). One curved reflector is positioned in the display system to reflect light from the displayed image or illuminated object through the beamsplitter onto the retroreflector. The second curved reflector is positioned in the display system to receive retroreflected light that is reflected from the beamsplitter and reflect it into a viewing space as an undistorted real image. To achieve this effect, the curved reflectors have curved reflective surfaces with matching size and shape (e.g., curvature) that are located and oriented in the display system such that the light they each reflect strikes a matching area on their reflective surfaces, such that distortion created by the first curved reflector is reversed or undistorted by the second curved reflector. The curved reflector may take the form of a partial cone, a semi-sphere, a partial cylinder, or other useful curved shape.

More particularly, one embodiment of a display system is provided that is configured for displaying retroreflective real images in a viewing space that are viewable over a wide angle. The display system includes first and second display stations or assemblies (with other implementations including three, four, or more). The first display station includes a first beamsplitter, a first retroreflector at an offset angle from the first beamsplitter, and at least one of a first display configured to output a displayed image and a first object illuminated by a light source. In the first display station, the first display and/or the first object are positioned such that light from the first display and the first object are reflected from or transmitted through the first beamsplitter onto a retroreflective surface of the first retroreflector to be retrore-flected back toward the first beamsplitter to be reflected from or transmitted through the first beamsplitter into the viewing space as a first real image. The second display station is similar in configuration or design with a second beamsplitter, a second retroreflector at an offset angle from the second beamsplitter, and at least one of a second display configured to output a displayed image and a second object illuminated by a light source. In the second display station, the second display and/or the second object are positioned such that light from the second display and/or the second object are reflected from or transmitted through the second beamsplitter onto a retroreflective surface of the second retroreflector to be retroreflected back toward the second beamsplitter to be reflected from or transmitted through the second beamsplitter into the viewing space as a second real image that at least partially overlaps the first real image to form an overlapping real image.

In some implementations of this first display system embodiment, the offset angle is 45 degrees and the first and second beamsplitters are formed of planar sheets or panes of at least partially transmissive material. The second beamsplitter abuts the first beamsplitter along one edge and is rotated about an axis extending through the one edge by a rotation angle. Additionally, the retroreflective surface of the second retroreflector abuts the retroreflective surface of the first retroreflector along one edge and is rotated about an axis extending through the one edge by the rotation angle. The rotation angle may be in the range of 15 to 45 degrees such as about 20 degrees. Additionally, the second display and the second object are rotated from the first display and the second object, respectively, by the rotation angle. In practice, the first and second real images typically have matching angular orientations in the viewing space and may substantially fully overlap each other.

According to a second embodiment or aspect of the description, a display system is described that is configured for displaying wide-angle, retroreflective real images in a viewing space. This display system includes a retroreflector with a retroreflective surface, a beamsplitter oriented at an offset angle to the retroreflective surface, and a first reflector with a curved reflective surface. Further, the display system includes a light source configured to output light associated with a display or illuminated object. Particularly, the output light is directed onto the curved reflective surface which first reflects the output light onto the beamsplitter, and a portion of the first reflected output light is transmitted through the beamsplitter onto the retroreflective surface producing ret-roreflected light that is directed back onto the beamsplitter which reflects a portion of the retroreflected light. Significantly, the display system also includes a second reflector with a curved reflective surface. The second reflector is positioned such that the curved reflective surface of the second reflector receives and reflects the portion of the retroreflected light reflected from the beamsplitter to form a retroreflective real image in the viewing space.

In some implementations of this second display system, the curved reflective surfaces of the first and second reflectors have matching shapes, e.g., are mirrors shaped to have matching partial conical, spherical, or cylindrical shapes. The system may be designed and assembled such that the output light strikes the curved reflective surface of the first reflector at a corresponding portion of the curved reflective surface of the second reflector that reflects the portion of the retroreflected light reflected from the beamsplitter. Further, the curved reflective surfaces of the two reflectors or mirrors are preferably located at matching angular orientations to and offset distances from opposite sides of the beamsplitter, with the curved reflective surfaces being concave and facing opposite sides of the beamsplitter.

In some implementations of the second or alternative display system, the retroreflective surface is curved, whereby an acceptance angle of the retroreflective surface maintained for large viewing angles in the viewing space. In these or other embodiments, the display system further includes a second retroreflector with a retroreflective surface positioned to receive and retroreflect a portion of the output light reflected from the beamsplitter. In such cases, the received and retroreflected portion of the output light is directed onto the reflective surface of the second reflector to be reflected for viewing as part of the retroreflective real image.

To provide depth via foreground, background, or other imagery, the display system may be implemented with the second reflector being at least partially transmissive of light. In such implementations, the display system may further include a display or illuminated object positioned and configured to direct light associated with additional imagery onto a surface of the second reflector that is opposite the reflective surface of the second reflector, whereby at least a portion of the light associated with the additional imagery is transmitted through the second reflector for viewing in the viewing space with the retroreflective real image.

DETAILED DESCRIPTION OF THE PREFERRED EMBODIMENTS

Figure 1:
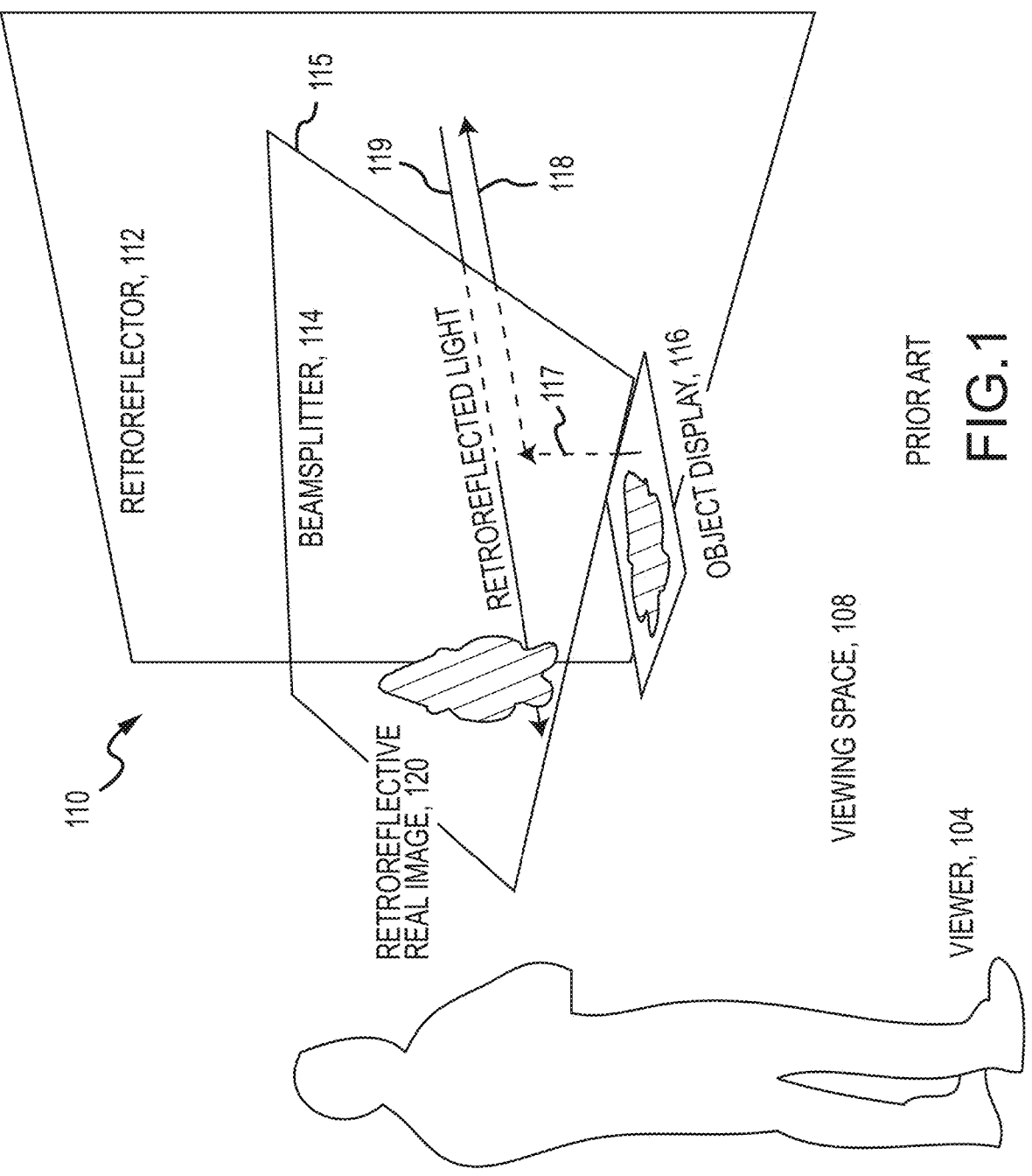
FIG. 1 illustrates a prior art display system that combines a retroreflector (e.g., a screen of retroreflective material) with a beamsplitter and an illuminated object/display in a conventional manner.
Figure 2A:
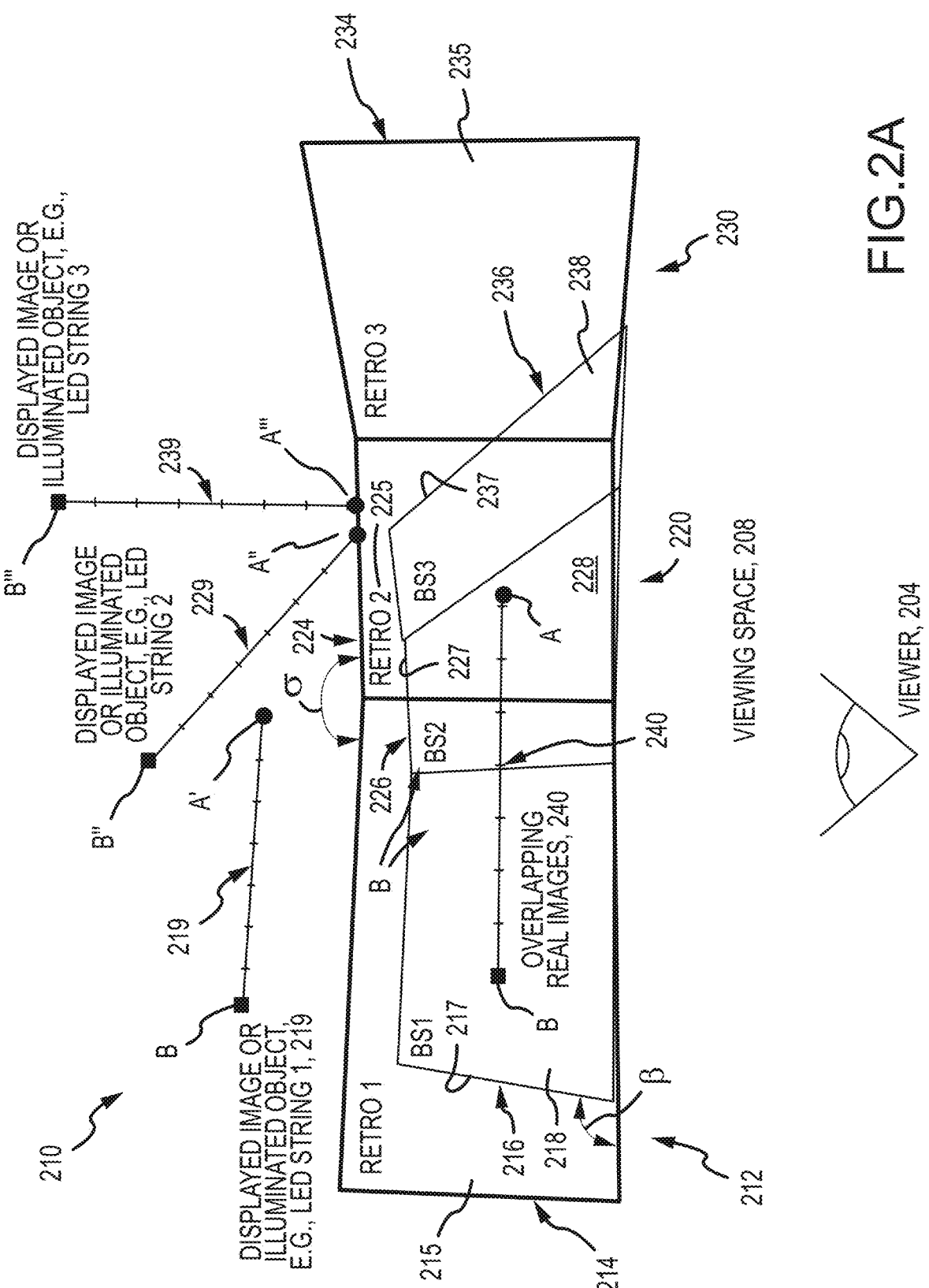
FIG. 2A illustrates a display system using a retroreflective pyramid to provide a wide-angle, retroreflective real image according to one aspect of the present description.
Figure 2B:
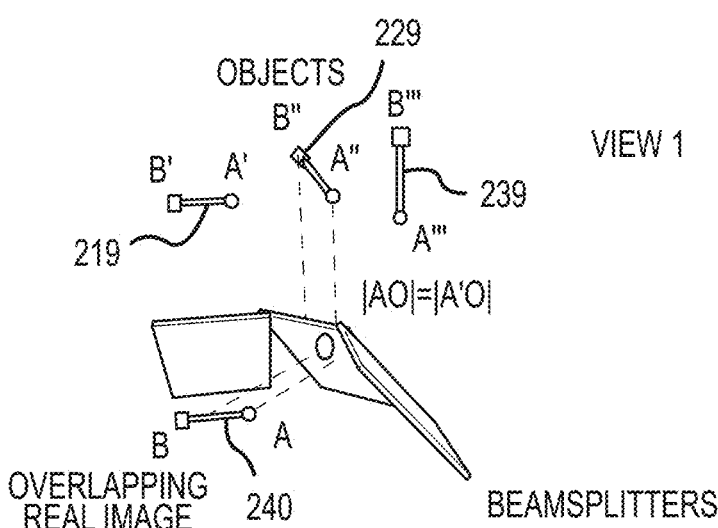
FIG. 2B illustrates another view of the display system of FIG. 2A.
Figure 2C:
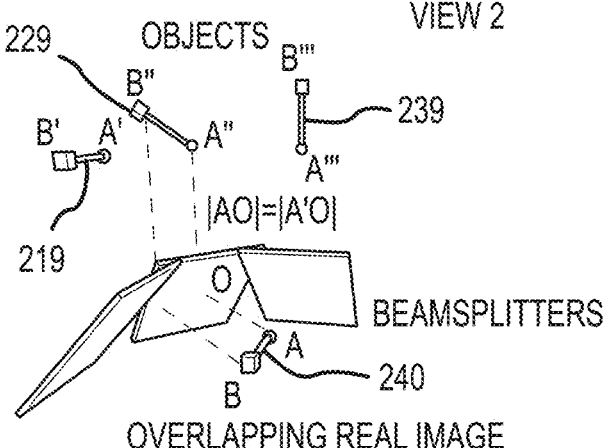
FIG. 2C illustrates yet another view of the display system of FIG. 2A.
Figure 2D:
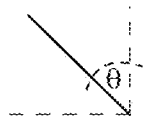
FIG. 2D illustrates a simplified top plan view of the display system of FIG. 2A.
Figure 2D:
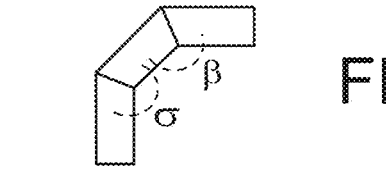

Briefly, the following description describes display systems (and corresponding display methods) that are configured or operable to produce wide-angle, retroreflective real images in a viewing space. As will be discussed with reference to FIG. 2A-2D, a first exemplary display system produces co-located or overlapping real images using a retroreflective pyramid design combined with rotated illuminated objects or displayed images. As will be discussed with reference to FIGS. 3-5B, a second display system embodiment produces wide-angle, undistorted retroreflective real images by utilizing reflectors having matched or matching curved reflecting surfaces. In various embodiments, a wider field of view can be generated by including curved optical elements (e.g., mirrors, reflective surfaces, lenses) and distortion that may be introduced via the curvature of a first optical element can be reversed by the use of another or second optical element within the system that includes a corresponding or matched curvature of the first optical element. By matching curvature of optical elements a wide field of view can be generated that is free or substantially free of distortion. To that end, although various examples are discussed with specific reference to mirrors or beam splitters, it should be understood that various embodiments may utilize other types of optical elements (e.g., lenses) that can generate a similar effect. As such, the discussion of any particular type of optical element is meant as illustrative only.

FIGS. 2A-2D illustrate a display system 210 using a retroreflective pyramid to provide a wide-angle, retroreflective real image 240 to a viewer 204 in a viewing space 208 according to one aspect of the present description. The display system 210 may include two or more real image display assemblies or stations with three stations 212, 220, and 230 shown in FIGS. 2A-2D. Each display assembly/station 212, 220, and 230 includes a retroreflector or retroreflective screen 214, 224, and 234 with a planar reflective surface (or surface of retroreflective material) 215, 225, and 235, which may be arranged vertically as shown but this is not required. Also, each display assembly/station 212, 220, and 230 includes a beamsplitter 216, 226, 236 with a first or back surface 217, 227, or 237 facing the corresponding retroreflective surface 215, 225, or 235 at a pitch angle, θ, which typically will be 45 degrees. The beamsplitters 216, 226, and 236 include a second or front surface 218, 228, or 238 facing the viewing space 208 and viewer 204. The beamsplitters 216, 226, and 236 may be of conventional design to be planar and formed of a material such as half-silvered glass, plastic, mylar film or the like that is at least partially transmissive and partially reflective to light.

Significantly, though, the display stations 212, 220, and 230 are arranged such that adjacent pairs of the beamsplitters and adjacent pairs of the retroreflective surfaces are abutting or have mating sidewalls, and these are angularly offset or yaw rotated from each other by angle, β, and angle, σ. In some embodiments, these two angles, β and σ, are equal or substantially equal, and may be chosen based on the angle of acceptance of the retroflector to be about 45 degrees or may, in other cases, be in the range of 15 to 45 degrees or larger in some cases.

Further, each assembly/station 212, 220, and 230 includes a display for providing a displayed image or an object combined with a light source to provide an illuminated object 219, 229, or 239. For example, a display device such as a monitor may be used to provide a 2D or 3D still or animated image or one or more light sources may be used to illuminate one or more physical 3D objects. As illustrated, the illuminated object took the form of a string of light sources (e.g., light-emitting diodes (LEDs)), which can be illuminated together or in varying patterns to achieve a desired effect, e.g., as a bolt of lightning or other illuminated flash. In other examples, the objects may be three-dimensional objects or displays, such as two-dimensional displays where the light from the display is reflected via the system. These displays or objects are positioned to provide the displayed images or illuminated objects 219, 229, and 239 at locations offset some desired distance from the first or back surface 217, 227, and 237 of the beamsplitters 216, 226, and 236, and a corresponding real image 240 will be produced in the viewing space at this same distance from the second or front surfaces 218, 228, and 238.

The real image 240 is formed via an overlapping of the individual real images produced by operation of each station/assembly 212, 220, and 230, and, to account for the rotation or offsetting of the side-by-side stations/assemblies 212, 220, and 230 (or their retroreflectors and beamsplitters) (see FIGS. 2B and 2C), the displayed images or illuminated objects 219, 229, and 239 are also angularly rotated (e.g., as illustrated by the changing orientation of the ends of the objects A, B, A', B', A'', B'', A''', and B'''). Depending on the desired effect or overlapping in image 240, the amount of yaw rotation or rotation angle between adjacent ones of the images/objects 219, 229, and 239 may be set to match the offset yaw angles, β, or to differ by some desired amount, with a rotation of 45 degrees shown (e.g., displayed image or illuminated object 229 is yaw rotated 45 degrees from displayed image or illuminated object 219 and image/object 239 is yaw rotated 45 degrees in same direction (here clockwise) from image/object 229). In this way, a real image 240 is produced by operation of the system 210 that provides a retroreflective real image that is viewable over a wide viewing angle by the viewer 204 in the space 208. More specifically, the multiple stations and arranged angles counteract the changed orientation of the object, such that the final viewable object 240 will appear in a desired orientation (e.g., matching the first object 219).

As will be appreciated, the display system 210 uses multiple (2 or more) retroreflective real image display stations/assemblies/setups 212, 220, and 230. The beamsplitters 216, 226, and 236 are flat while the retroreflective surface 215, 225, and 235 may also be flat/planar or may be curved in some implementations. The stations/assemblies 212, 220, and 230 are provided in a pyramid or other angular arrangement (e.g., with their retroreflectors and beamsplitters both at angular offsets from adjacent stations/assemblies, see FIGS. 2B and 2C) so that each station's retroreflective real image overlaps and is coincident with the other stations's real images to display or produce the overlapping real image(s) 240. As will be understood with reference also to FIG. 1 and reference to station/assembly 212 (with similar operation in stations 220 and 230), light from the displayed image or illuminated object 219 strikes the first or back surface 217 of the beamsplitter 216. A portion of this light is reflected on the retroreflective surface 215 where it is retroreflected back to the virtual image of its source, causing it to be transmitted through the beamsplitter 216 via second or front surface 218 and into the viewing space 208.

To achieve a desirable real image 240, each of the displayed images or illuminated objects 219, 229, and 239 are appropriately yaw, pitch and rolled rotated relative to their neighbor in the system 210 (see FIGS. 2B and 2C) so that the real image of each of the stations/assemblies 212, 220, and 230 is aligned properly with the real images of the other stations/assemblies 212, 220, and 230. Yawing the 45 degree beamsplitter/mirror 216, 226, and 236 by angle, β, will also cause a pitching of the real image relative to the beamsplitter. In a retroreflective real image setup, the distance between a point on the real-image to the beamsplitter is the same as the distance between its corresponding point on the object to the beam-splitter. Therefore, in neighboring stations where the beamsplitter has different rotations relative to the overlapping real images fixed in space, the corresponding objects in these stations also will have different rotations relative to each other. The relationship between the real-image to beamsplitter distance and the object to beamsplitter distance also means the depths and shapes of the 3D retroreflective real images objects will appear depth inverted (or pseudoscopic) to the viewer and may appear to have depth-occlusion miscues. Therefore, the arrangement and shapes 3D objects relative to the beamsplitter may need to be depth inverted from the desired arrangement and shapes of the 3D retroreflected real images relative to the beamsplitter and viewer for the viewer to see the intended arrangement and shapes of the 3D retroreflected real images.

In some cases, there may be seams where two side-by-side or neighboring stations/assemblies meet (such as between station 212 and 220), and this may be addressed by tiling the retroreflectors and or minimizing beamsplitter bevels when using rigid plastic beamsplitters. However, the seams are in different focal planes than the image/object and may not be noticeable to the viewer 204. In practice, light from one station/assembly should be prevented or at least minimized from entering a second station/assembly, and this can be achieved using baffles or the like (not shown as being readily understandable by those in the arts).

The system 210 provides several advantages over prior systems such as that shown in FIG. 1. The use of multiple real image retroreflective setups or stations in a pyramid is a simple arrangement and well behaved in that it produces low distortion or "swim" in the overlapping real images. Because the beamsplitters used are flat or planar, there are no distortions or changes in depth or size in the retroreflective real image. The use of multiple setups/stations requires multiple matching images/objects that are synchronized, but this is readily achievable. Stated differently, it is relatively straight forward to provide matching images/objects that are properly positioned relative to their corresponding beamsplitters and are also rotated such that the real images are co-located in the viewing space and provide a desired visual effect (e.g., allow a viewer to see an image/object from a different perspective as would be expected when viewing from a different viewing angle or location in the viewing space such as by showing a front view with one station, an angled profile or side view with a next station, and a full side view from a third station or the like). As can be appreciated, the amount of rotation or angular offset between the different stations may depend on the desired visual effect of the object.

More specifically, using multiple retroreflective real images that overlap in space allows the display system to be configured for and operated to create view-dependent effects such as multi-view images. For most viewing angles of the retroreflective real image, the viewer is looking into only one facet or setup/station of the pyramid at a time. When viewing along the scam of two facets or stations, two overlapping real images can be combined. The displays or objects are allowed to change or vary from one facet or station to another in some implementations of the display system 210. For example, in a standard retroreflective real image setup or station (such as station 212), when a retroreflective real image of a character displayed on a monitor is viewed off axis, it will appear planar, flat, and dimmer. However, the orientation of the display device or monitor (or illuminated object) can be changed between facets or stations of the pyramid so that the viewer always sees the display or illuminated object that is oriented towards them and mostly on axis. This multi-view imaging allows for one viewer in the viewing space to see a character's frontal view while another viewer in the space sees the character in a three-quarter view or in profiled. These view-dependent effects also allow for the displayed image or illuminated object to be configured to allow for a character to have eye contact with just one viewer (e.g., the character's eyes are directed towards one viewer and not others).

Figure 3:
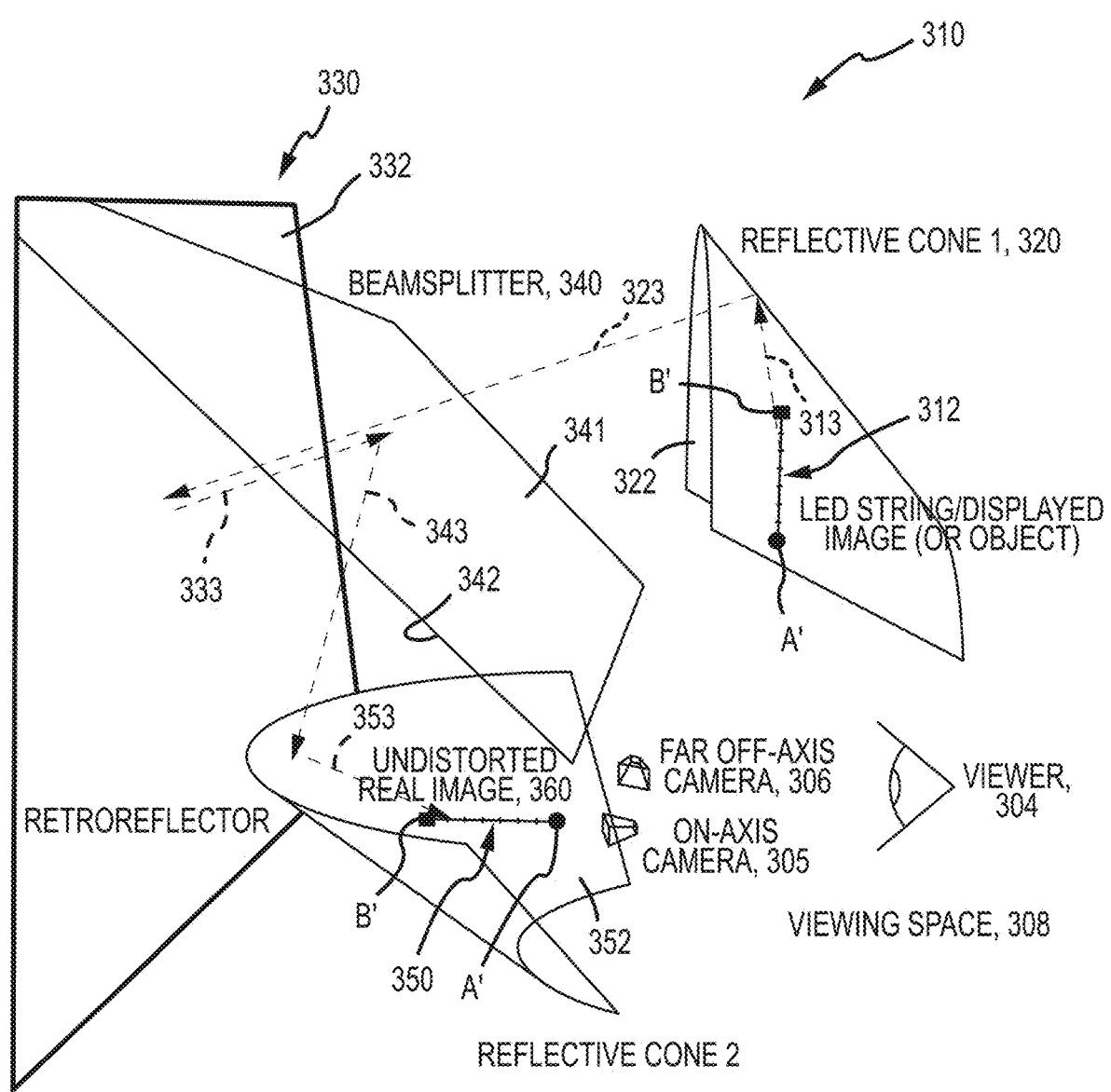
FIG. 3 illustrates another display system according to a second aspect of the present description that combines a pair of reflectors or mirrors with a beamsplitter and a retrore-flector to produce a wide-angle retroreflective real image.

FIG. 3 illustrates another display system 310 according to a second aspect of the present description that combines a pair of reflectors or mirrors 320, 350 with a beamsplitter 340 and a retroreflector 330 to produce a wide-angle retroreflective real image. In this example, the reflected images may appear brighter as compared to the first example. As discussed above, the mirrors or reflectors 320 and 350 may take a wide range of curved shapes including the cone or partial cones shown in FIG. 3, a semi-sphere, a portion of a cylinder, and so on. The mirrors or reflectors 320 and 350 are physically co-located within the display system 310, with equal distances from their curved reflective surfaces 322 and 352 to first and second sides or surfaces 341 and 342 of a flat or planar beamsplitter 340, and the curved reflective surfaces 322 and 352 are oriented similarly such that light in the system strikes the same area or portion of the surfaces 322 and 352 to produce the undistorted real image 360 in the viewing space 308 observable without special eyewear by the viewer 304. Further, the curved reflective surfaces 322 and 352 face the beamsplitter 340 and are concave relative to the beamsplitter 340 as shown in FIG. 3. The surfaces 322 and 352 often will be mirror surfaces or one or both may be at least partially transmissive of light as may be the case when it is desirable to provide the reflector/mirror 350 as a transmissive element to allow light from displays or objects behind it to be transmitted through to the viewing space 308 (as discussed below).

As shown, the display system 310 is configured and operable to produce a wide-angle retroreflective real image 360 in a viewing space 308. The image 360 is an undistorted and full-sized image of an illuminated object or displayed image 312, with light 313 from the object or display (not shown) displaying the image(s) being directed onto the curved reflective surface 322 (see, points g and h) of the first reflector 320 (which is shown in this example to be a reflective cone). The curved reflective surface 322 reflects the light as shown with arrow 323 onto the first surface or side 341 of the beamsplitter 340, which transmits at least a portion through to the retroreflective surface 332 of the retroreflector 330 that is at an offset angle (e.g., a 45-degree angle) from the second or back surface or side 342 of the beamsplitter 340.

The retroreflective surface 332 is typically planar or flat as shown, but may be curved, and it retroreflects the light 323 transmitted through the beamsplitter 340 as shown with arrow 333 toward the second or back surface or side 342 of the beamsplitter 340. A portion of the retroreflected light 333 is reflected by the back surface 342 onto the curved reflective surface 342 of the second reflector or mirror 350 (e.g., a reflective cone as shown in FIG. 3). The reflector 350 is configured to reflect all or a portion of the light 343 as shown with arrow 353 into the viewing space 308 to provide a retroreflective real image 360 viewable by a viewer 304 in the space 308 over a wide range of viewing angles, e.g., off-axis as well as conventional on-axis viewing of image 360.

In one practical implementation, the display system 310 uses two matching concave mirrors 320 and 350, a flat beamsplitter 340, and a retroreflector 330. The first curved mirror 320 collects with surface 322 the object's light 313 (see, points g and h) over a wide angle and directs it as shown with arrow 323 through the flat beamsplitter 340 to the retroreflector 330. From the surface 332, the light 323 is retroreflected as shown with arrow 333 back to the source, but it is reflected as shown by arrow 343 by the flat beamsplitter 340 to the second matching curved mirror 350, which reflects it as shown by arrow 353 (see points g' and h') to form an undistorted, wide-angle viewable, retroreflective real image 360.

Figure 4:
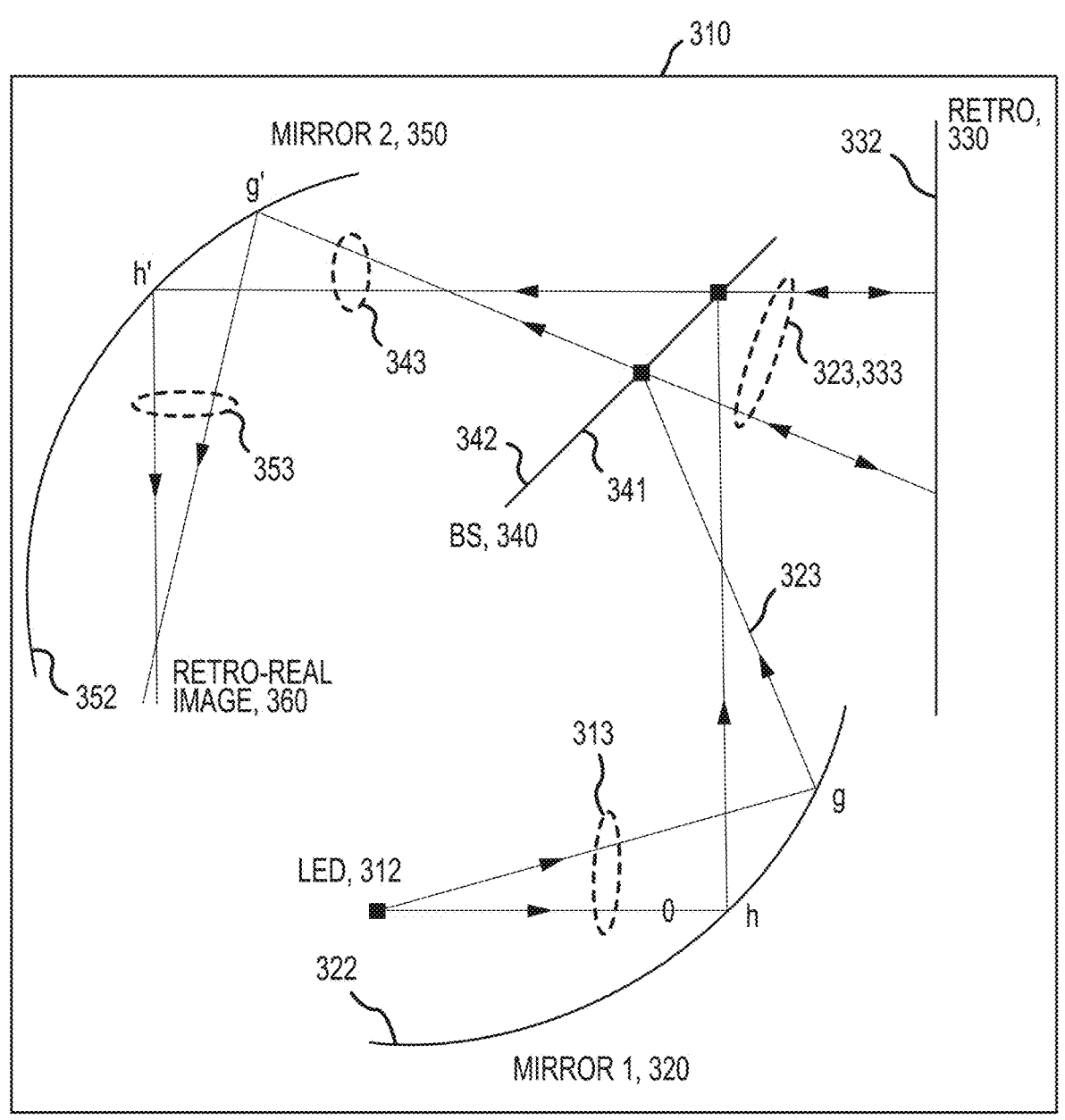
FIG. 4 is a schematic representation of the display system of FIG. 3 during its operations including collection of light over a wide angle with first mirror surface and optical undoing or "undistortion" performed by the matching second mirror surface to produce the retroreflective real image.
Figure 5:
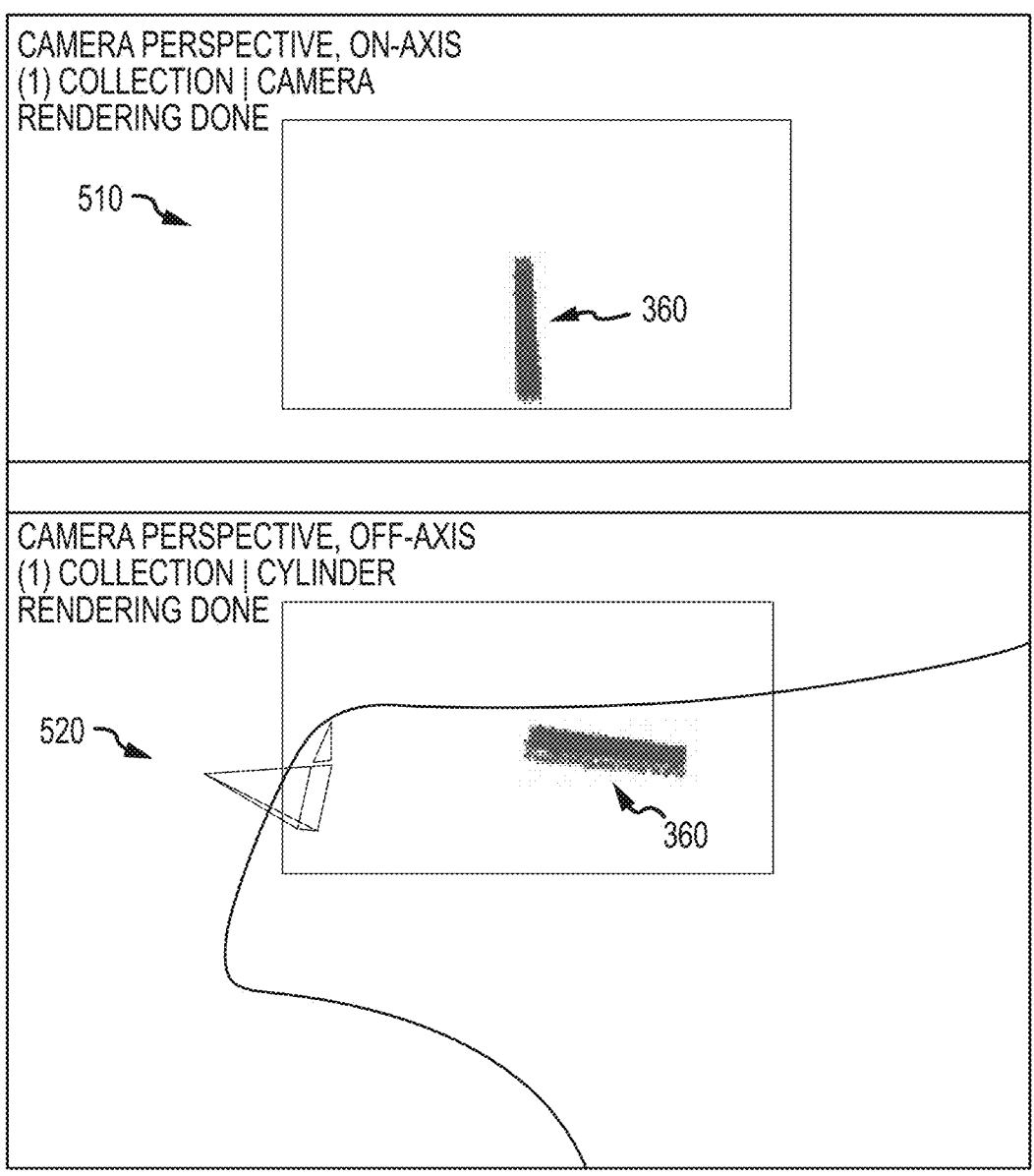
FIG. 5 illustrates renderings of images captured by an on-axis camera and a far off-axis (or wide-angle view) camera provided in the operating display system of FIG. 3.

The system 310 is shown schematically in operation in FIG. 4. FIG. 4 illustrates collection of light over a wide angle with first mirror surface 322 and undistortion performed by the matching second mirror surface 352 to produce the retroreflective real image 360, with FIG. 4 differing from FIG. 3 with the beamsplitter 340 being positioned to reflect light as shown with arrows 323 rather than transmit it to the retroreflective surface 332 and to transmit rather than reflect the retroreflected light 333 as shown with arrows 343. FIG. 5 illustrates renderings 510 and 520 of 3D line images of the retroreflective real image 360 of a 3D line object. The retroreflected real images are captured by an on-axis camera 305 and a far off-axis (or wide-angle view) camera 306 provided in the viewing space during operations of the operating display system 310 of FIG. 3. The retroreflected real images are undistorted and appear as a straight 3D line as the object.

As will be understood, the curved reflective or mirror surface 352 of the second reflector or mirror 350 undoes any demagnification and distortion introduced by the curved reflective or mirror surface 322 of the first reflector or mirror 320 to produce a 1:1 retroreflected real image 360 of the object or displayed image 312 that is viewable by the viewer 304 over a large area in the viewing space 308. To achieve this functionality, the real image of the first curved mirror 320 should overlap and be coincident with the physical matching second curved mirror. Reversibility of light and symmetry of the optical system (i.e., surfaces 322 and 352 and their location and orientation relative to beamsplitter 340) means that the distorted light 323 from the first mirror or reflector 320 returning to or striking the corresponding area or spot on the second mirror's surface 352 (which has the same angular orientation relative to the beamsplitter 340 and has the same shape (i.e., curvature)) will become undistorted (or follow the path to the retroreflective real image 360 corresponding to the path to the object or displayed image 312).

The design of the display system 310 provides several advantages over prior attempts to providing a wide-angle retroreflective real image. By placing the retroreflective real image of one curved mirror onto a matching physical mirror, any distortion introduced by the first curved mirror is cancelled by the second curved mirror. This allows the display system to be configured to create undistorted, wide field of view (FOV), 1:1, retroreflective real images that can be viewed by many people. Also, there are no seams in the field of view, and the display system only requires one object or displayed image. However, large matching curved optics are preferred to achieve more optimal results in such a display system, but this appears to be readily achievable in many applications or viewing space environments.

To achieve some particular visual effects, the concepts taught with regard to the display systems 210 and 310 can be expanded upon by repeating elements or adding additional components. For example, the display system 210 includes three stations/assemblies for providing the retrore-flective real image, but two such stations may be used or four or more May be included. Similarly, one object/displayed image is shown but two or more may be included, and the system 210 can be modified to provide additional imagery such as may be achieved using a Pepper's Ghost technique and associated equipment.

Figure 6:
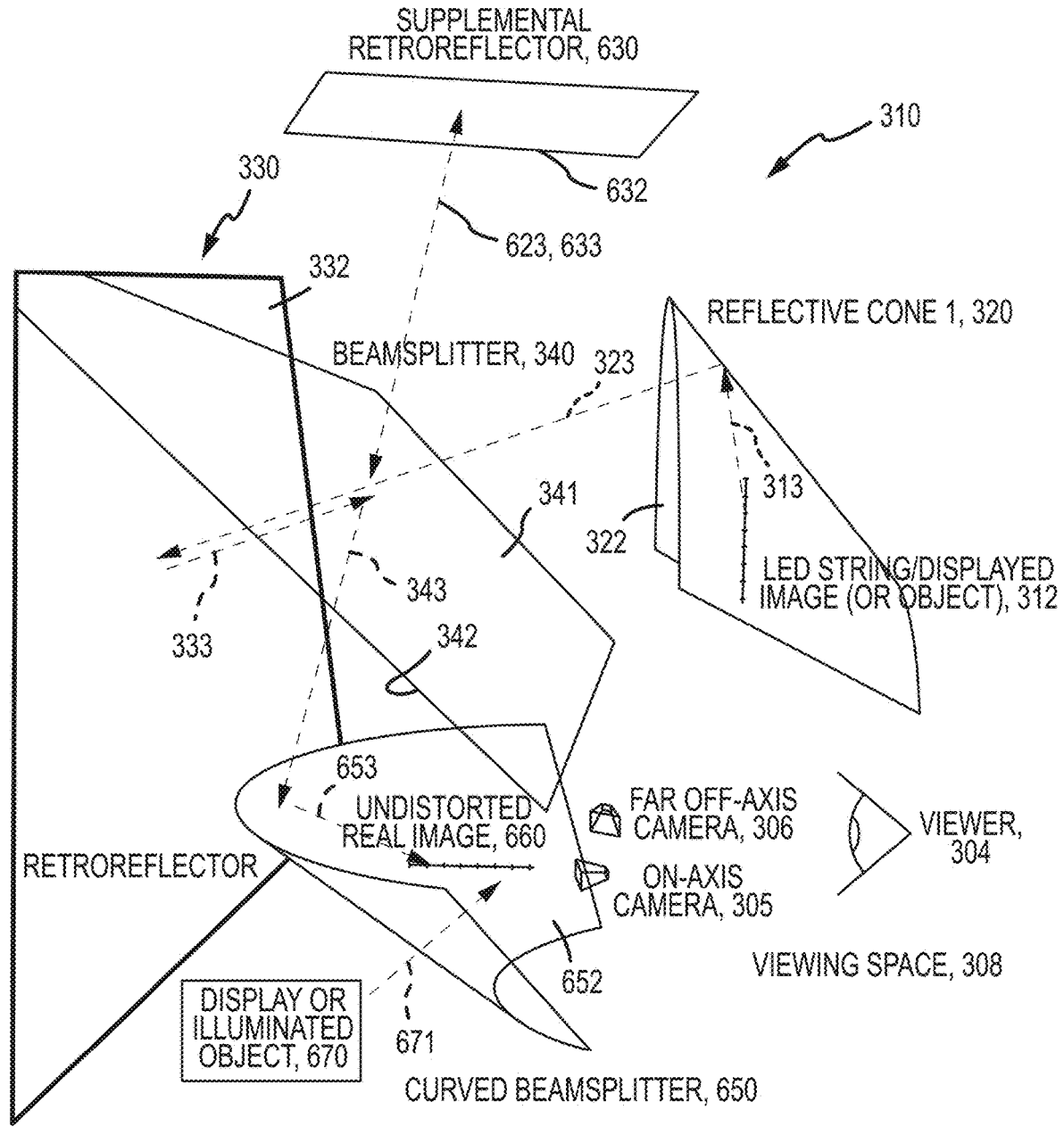
FIG. 6 illustrates an embodiment of a display system similar to that of FIG. 3 but further including an additional or supplemental retroreflector and display or illuminated object to provide a brighter retroreflective real image along with additional imagery (e.g., background and/or foreground images).

With this in mind, FIG. 6 illustrates an embodiment of a display system 610 similar to the system 310 of FIG. 3, with repeated or matching components having like numbering and not being further described here. The system 610 further includes a second or supplemental retroreflector 630 that is provided to capture the portion 623 of the light 323 from the first reflector 320 that is not passed to the first reflector 330. In the example, the retroreflector's retroreflective surface 632 is position (e.g., at a 45-degree offset) from the first surface/side 341 of the beamsplitter 340 so as to receive the portion of the light 323 that is reflected by the beamsplitter 340 as shown with arrow 623. In other embodiments, the second retroreflector 630 may be provided to receive light transmitted through the beamsplitter 340 if the first retrore-flector 330 receives light transmitted through the beamsplitter 340. The retroreflector 630 retroreflects this light 623 as shown with arrow 633 back through the beam beamsplitter as shown at 343 and onto the reflective surface 352 of the reflector 350 (mirror or reflector 350 of display system 310) or surface 652 of curved beamsplitter 650 as shown in system 610. This additional light from the displayed image or illuminated object 312 is added to that from the first retroreflector 330 to increase the brightness of the created retroreflective real image 660.

To provide background and/or foreground images with the real image 660, the system 610 is further shown to include a display (operable to display a displayed image) and/or an illuminated object (e.g., one or more objects with their own light sources such as an LED string and/or that are illuminated with external light sources) 670. The second reflector 350 of system 310 is replaced with a curved beamsplitter 650 that is at least partially transmissive to light and has a curved surface 652 matching the surface 322 to undo the distortion imparted by the reflector 320. The display or object 670 is placed behind the beamsplitter 650 in a space opposite the viewing space, and light 671 from the display or object 670 is transmitted (at least partially) through the beamsplitter 650 where is observed as background or foreground imagery with the real image 660 by the viewer 304.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In some embodiments, the retroreflector's retroreflective surfaces may be curved rather than flat or planar as shown. This may be useful in some applications so the angles of incidence onto the retroreflector are reduced, which can insure that the retroreflector's acceptance angle is maintained for large viewing angles.

The light that is used to create the retroreflective real image may originate from nearly any light source such as an "object" in the form of a string of LEDs as shown, an illuminated object(s) upon which light from one or more sources is directed (including a screen that is projected upon), or a display or display device with an illuminated screen or monitor. The display may be planar in one flat plane or may be a multi-focal/multi-planar display (either transverse or longitudinal to the depth plane. In other cases, the "object" is illuminated via its multiple LED strips in multiple paths while this or other configurations may include or be replaced with brightly lit and/or emissive 2D or 3D objects or displays. It will also be understood that retroreflective real images are pseudoscopic such that the depth of any multi-planar display or 3D object/display with depth should be configured to invert the depth from that desired for the retroreflective real image.

The solutions described herein allow more viewers to see and interact with retroreflective real images over a wider area and viewing angle. Also, the viewers no longer need to be only facing towards a flat wall but, instead, may be arranged in a more casual or natural arc around the retroreflective real image. The viewers may also see the retroreflective real image from more angles. When used with a 3D object, string of LEDs, or multi-view displays, the retroreflective real image will appear more dimensional, even allowing the viewer to see the object or displayed image from the end face or in profile. When compared with many other approaches, the new display system can also be designed and constructed to have a smaller footprint while also providing clearer, higher-contrast real images.

What is claimed is:

1. A display system for displaying wide-angle, retroreflective real images in a viewing space, comprising:
   a first display station comprising a first beamsplitter, a first retroreflector at a first offset angle from the first beamsplitter, and at least one of a first display configured to output a displayed image or a first object illuminated by a light source, wherein the at least one of the first display or the first object is positioned in the first display station such that light from the at least one of the first display or the first object is reflected from or transmitted through the first beamsplitter onto a retroreflective surface of the first retroreflector to be retroreflected back toward the first beamsplitter to be reflected from or transmitted through the first beamsplitter into the viewing space as a first real image; and a second display station comprising a second beamsplitter, a second retroreflector at a second offset angle from the second beamsplitter, and at least one of a second display configured to output a displayed image or a second object illuminated by a light source, wherein the at least one of the second display or the second object are is positioned in the second display station such that light from the at least one of the second display or the second object are is reflected from or transmitted through the second beamsplitter onto a retroreflective surface of the second retroreflector to be retroreflected back toward the second beamsplitter to be reflected from or transmitted through the second beamsplitter into the viewing space as a second real image that at least partially overlaps the first real image to form an overlapping real image, wherein the second beamsplitter abuts the first beamsplitter along one edge of the second beamsplitter and is rotated about an axis extending through the one edge of the first beamsplitter by a rotation angle, and wherein the retroreflective surface of the second retroreflector abuts the retroreflective surface of the first retroreflector along one edge of the retroreflective surface of the first retroreflector and is rotated about an axis extending through the one edge of the retroreflective surface of the first retroreflector by the rotation angle.

2. The display system of claim 1, wherein the first offset angle, the second offset angle, or both is a pitch angle of 45 degrees.

3. The display system of claim 1, wherein the rotation angle is in a range of 15 to 45 degrees.

4. The display system of claim 1, wherein the second display is rotated from the first display by the rotation angle.

5. The display system of claim 1, wherein the first and second real images have matching angular orientations in the viewing space and substantially fully overlap.

6. The display system of claim 1, wherein the first and second beamsplitters comprise planar sheets or panes of at least partially transmissive material.

7. The display system of claim 1, wherein the second object is rotated from the first object by the rotation angle.

8. A display system for displaying wide-angle, retroreflective real images in a viewing space, comprising:
   a first display station comprising a first beamsplitter, a first retroreflector at a first offset angle from the first beamsplitter, and at least one of a first display configured to output a displayed image or a first object illuminated by a light source, wherein the at least one of the first display or the first object is positioned in the first display station such that light from the at least one of the first display or the first object is reflected from or transmitted through the first beamsplitter onto a retroreflective surface of the first retroreflector to be retroreflected back toward the first beamsplitter to be reflected from or transmitted through the first beamsplitter into the viewing space as a first real image;

a second display station comprising a second beamsplitter, a second retroreflector at a second offset angle from the second beamsplitter, and at least one of a second display configured to output a displayed image or a second object illuminated by a light source, wherein the at least one of the second display or the second object is positioned in the second display station such that light from the at least one of the second display or the second object is reflected from or transmitted through the second beamsplitter onto a retroreflective surface of the second retroreflector to be retroreflected back toward the second beamsplitter to be reflected from or transmitted through the second beamsplitter into the viewing space as a second real image that at least partially overlaps the first real image to form an overlapping real image; and a third display station comprising a third beamsplitter, a third retroreflector at a third offset angle from the third beamsplitter, and at least one of a third display configured to output a displayed image or a third object illuminated by a light source, wherein the at least one of the third display or the third object is positioned in the third display station such that light from the at least one of the third display or the third object is reflected from or transmitted through the third beamsplitter onto a retroreflective surface of the third retroreflector to be retroreflected back toward the third beamsplitter to be reflected from or transmitted through the third beamsplitter into the viewing space as a third real image that at least partially overlaps at least one of the first real image or the second real image in the overlapping real image.

9. A display system for displaying wide-angle, retroreflective real images in a viewing space, comprising:

first and second beamsplitters, wherein the second beamsplitter abuts the first beamsplitter along one edge of the first beamsplitter and wherein the second beamsplitter is rotated about a first axis extending through the one edge of the first beamsplitter by a rotation angle relative to the first beamsplitter;

first and second retroreflectors, wherein the first retroreflector is at a first offset angle from the first beamsplitter, the second retroreflector is at a second offset angle from the second beamsplitter, the first retroreflector abuts the second retroreflector along one edge of the first retroreflector, the second retroreflector is rotated about a second axis extending through the one edge of the first retroreflector by the rotation angle relative to the first retroreflector, and the first and second retroreflectors are positioned to receive light transmitted through or reflected from the first and second beamsplitters, respectively, and in response, to reflect the light back toward one of the first or second beamsplitters; and first and second light sources operable to provide light to the first and second beamsplitters such that the first and second beamsplitters transmit or reflect the light to the first and second retroreflectors respectively, wherein each of the first and second light sources comprise at least one of an illuminated object or a display.

10. The display system of claim 9, wherein the first and second light sources are oriented to rotate the at least one of the illuminated object or the display of the second light source by the rotation angle relative to the at least one of the illuminated object or the display of the first light source.

11. The display system of claim 9, wherein the rotation angle is in a range of 15 to 45 degrees.

12. The display system of claim 9, wherein the first light source is a distance from the first beamsplitter and the second light source is the distance from the second beamsplitter, whereby an overlapping retroreflective real image is formed in the viewing space by a combination of at least a portion of the light provided by the first and second light sources that is retroreflected from the first and second retroreflectors.

13. A display system for displaying wide-angle, retroreflective real images in a viewing space, comprising:

a retroreflector with a retroreflective surface;

a beamsplitter oriented at an offset angle to the retroreflective surface;

a first reflector with a curved reflective surface;

a light source configured to output light associated with a display or an illuminated object, wherein the output light is directed onto the curved reflective surface which first reflects the output light onto the beamsplitter as first reflected output light, and wherein a portion of the first reflected output light is transmitted through the beamsplitter onto the retroreflective surface producing retroreflected light that is directed back onto the beamsplitter which reflects a portion of the retroreflected light; and a second reflector with a curved reflective surface, wherein the second reflector is positioned such that the curved reflective surface of the second reflector receives and reflects the portion of the retroreflected light reflected from the beamsplitter to form a retroreflective real image in the viewing space.

14. The display system of claim 13, wherein the curved reflective surfaces of the first and second reflectors have matching shapes.

15. The display system of claim 14, wherein the output light strikes the curved reflective surface of the first reflector at a corresponding portion of the curved reflective surface of the second reflector that reflects the portion of the retroreflected light reflected from the beamsplitter.

16. The display system of claim 13, wherein the curved reflective surfaces are located at matching angular orientations to and offset distances from opposite sides of the beamsplitter.

17. The display system of claim 13, wherein the curved reflective surfaces are concave.

18. The display system of claim 13, wherein the retroreflective surface is curved, whereby an acceptance angle of the retroreflective surface is maintained for large viewing angles in the viewing space.

19. The display system of claim 13, further comprising a second retroreflector with a retroreflective surface positioned to receive and retroreflect a portion of the output light reflected from the beamsplitter, wherein the received and retroreflected portion of the output light is directed onto the reflective surface of the second reflector to be reflected for viewing as part of the retroreflective real image.

20. The display system of claim 13, wherein the second reflector is at least partially transmissive of light, and wherein the display system further comprises a display or illuminated object positioned and configured to direct light associated with additional imagery onto a surface of the second reflector that is opposite the reflective surface of the second reflector, whereby at least a portion of the light associated with the additional imagery is transmitted through the second reflector for viewing in the viewing space with the retroreflective real image.

* * * * *